(12) United States Patent
Beard et al.

(10) Patent No.: US 11,301,014 B2
(45) Date of Patent: Apr. 12, 2022

(54) POWER/DATA TRANSMISSION EXTENDER SYSTEM

(71) Applicant: Dell Products L.P., Round Rock, TX (US)

(72) Inventors: Neal Beard, Austin, TX (US); Shree Rathinasamy, Round Rock, TX (US); Victor Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/987,524

(22) Filed: Aug. 7, 2020

(65) Prior Publication Data

US 2022/0043496 A1 Feb. 10, 2022

(51) Int. Cl.
*G06F 1/26* (2006.01)
*G06F 1/28* (2006.01)

(52) U.S. Cl.
CPC .............. *G06F 1/266* (2013.01); *G06F 1/28* (2013.01)

(58) Field of Classification Search
CPC .................................. G06F 1/266; G06F 1/28
See application file for complete search history.

(56) References Cited

U.S. PATENT DOCUMENTS

| 6,414,884 B1* | 7/2002 | DeFelice | G06F 21/86 365/195 |
| 9,960,810 B1* | 5/2018 | He | H04B 3/548 |
| 2001/0003205 A1* | 6/2001 | Gilbert | G06F 1/266 713/320 |
| 2020/0304328 A1* | 9/2020 | Boemi | H04L 12/10 |

OTHER PUBLICATIONS

Versa Technology, VX-Pi1000SP Gigabit PoE Splitter, 2 pages, http://www.versatek.com/product/vx-pi1000sp-gigabit-poe-splitter/, Printed: Aug. 6, 2020.

* cited by examiner

*Primary Examiner* — Mark A Connolly
(74) *Attorney, Agent, or Firm* — Joseph Mencher

(57) ABSTRACT

A power/data transmission extender system includes a power/data transmission extender device that is coupled to a powering device and a powered device. The power/data transmission extender device receives power and data from the powering device via a first power/data cable that is connected to the power/data transmission extender device, and stores at least a portion of the power that was received from the powering device via the first power/data cable in a power storage subsystem that is included in the power/data transmission extender device. The power/data transmission extender device may then transmit the data that was received from the powering device, at least a portion of the power that was received from the powering device, and at least a portion of power that is stored in the power storage subsystem, to the powered device via a second power/data cable that is connected to the power/data transmission extender device.

20 Claims, 9 Drawing Sheets

POWER/DATA TRANSMISSION EXTENDER SYSTEM

BACKGROUND

The present disclosure relates generally to information handling systems, and more particularly to extending the transmission of power and data between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is often desirable to transmit power and data between information handling systems via a single cable in order to, for example, reduce the amount of cabling required to enable information handling systems functionality. For example, powering devices (also called Power Source Equipment (PSE)) may be provided by switch devices that are configured to transmit data and power via a power/data connector on the switch device and over a single cable connected that is to a Powered Device (PD) that may be provided by a camera, an access point, and/or other powered devices known in the art. In a specific example, the transmission of data and power over a single cable may be enabled using Power over Ethernet (PoE) techniques that transmit data over a first subset of wires in an Ethernet cable, and transmit power over a second subset of wires in that Ethernet cable. However, conventional single-cable power and data transmission techniques are only capable of transmitting power over a limited distance. For example, the PoE techniques discussed above are limited to transmitting power over approximately 100 meters of Cat5 Ethernet cable, as the voltage drop in the power transmitted over a Cat5 Ethernet cable that is greater than 100 meters long will cause that power to degrade to a level that may be insufficient for the powered device connected to that Cat5 Ethernet cable. As such, powered devices that require more than 100 meters of cable to connect to their powering device require a separate power source, thus increasing the amount of cabling needed for those powered devices.

Accordingly, it would be desirable to provide data/power transmission extender system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a power/data transmission extender engine that is configured to: receive, from a powering device, power and data via a first power/data cable that is coupled to the processing system; store at least a portion of the power that was received from the powering device via the first power/data cable in a power storage subsystem that is coupled to the processing system; and transmit, to a powered device, the data that was received from the powering device, at least a portion of the power that was received from the powering device, and at least a portion of power that is stored in the power storage subsystem, via a second power/data cable that is coupled to the processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
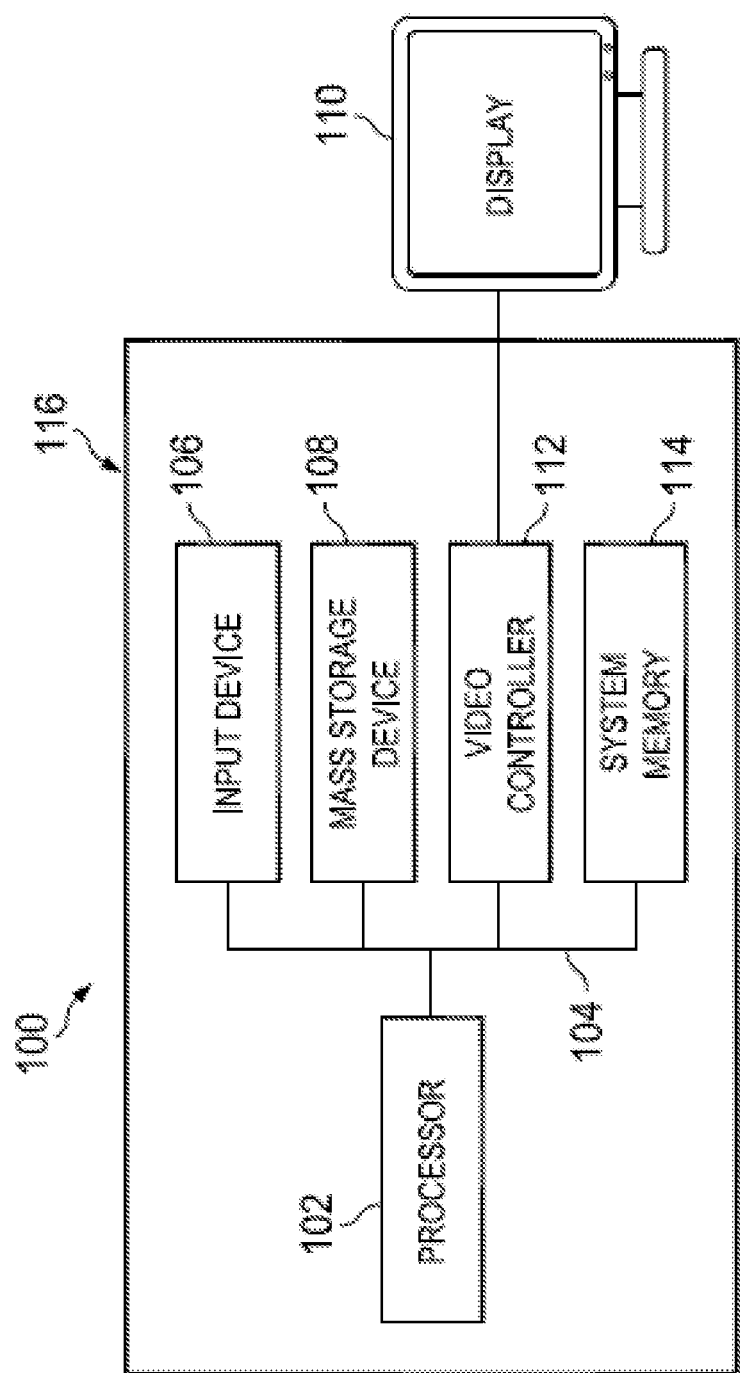
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
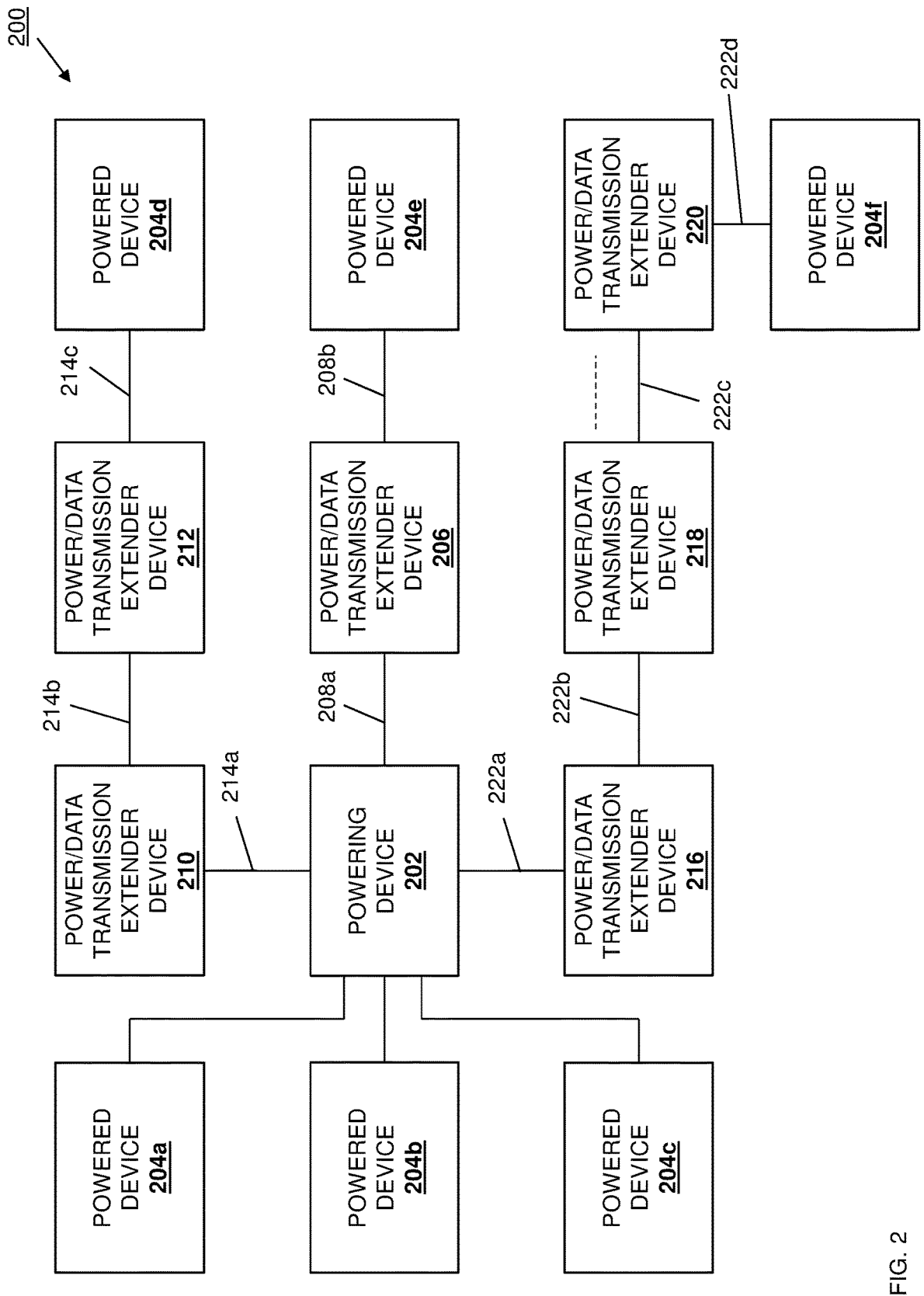
FIG. 2 is a schematic view illustrating an embodiment of a power/data transmission extender system.

Referring now to FIG. 2, an embodiment of a power/data transmission extender system 200 is illustrated. In the illustrated embodiment, the power/data transmission extender system 200 includes a powering device 202. In an embodiment, the powering device 202 may be provided by the IHS 100 discussed above with reference to FIG. 1, and/or may include some or all of the components of the IHS 100, and in specific examples may be provided by a switch device or other networking device that is configured to transmit/receive data and transmit power to a powered device via one or more of its ports and over a single cable connected to each of that port and the powered device. As discussed above, powering devices provided according to the teachings of the present disclosure may be provided by Power over Ethernet (PoE) switch devices, switch devices configured to transmit/receive data and transmit power using hybrid fiber/copper cabling described by the inventors of the present disclosure in U.S. patent application Ser. No. 15/929,605, filed on May 12, 2020; and U.S. patent application Ser. No. 15/929,654, filed on May 14, 2020; the disclosures of which are incorporated by reference in their entirety, and/or other powering switch devices that would be apparent to one of skill in the art in possession of the present disclosure. However, while illustrated and discussed as being provided by switch device(s), one of skill in the art in possession of the present disclosure will recognize that powering devices provided in the power/data transmission extender system 200 may include any devices that may be configured to operate similarly as the powering device 202 discussed below.

In the illustrated embodiment, the power/data transmission extender system 200 also includes a plurality of powered devices 204*a*, 204*b*, 204*c*, 204*d*, 204*e*, and up to 204*f*. In an embodiment, the powering devices 204*a*-204*f* may be provided by the IHS 100 discussed above with reference to FIG. 1, and/or may include some or all of the components of the IHS 100, and in specific examples may be provided by cameras, networking access points, phones, and/or any other computing devices that one of skill in the art in possession of the present disclosure would recognize as being configured to transmit/receive data and receive power from a powering device via one of its ports and over a single cable connected to that port and the powered device. As discussed above, powered computing devices provided according to the teachings of the present disclosure may be provide by Power over Ethernet (PoE) computing devices, powered computing devices configured to transmit/receive data and receive power using hybrid fiber/copper cabling described by the inventors of the present disclosure in U.S. patent application Ser. No. 15/929,605, filed on May 12, 2020; and U.S. patent application Ser. No. 15/929,654, filed on May 14, 2020; the disclosures of which are incorporated by reference in their entirety, and/or other powered computing devices that would be apparent to one of skill in the art in possession of the present disclosure. However, while illustrated and discussed as being provided by particular computing devices, one of skill in the art in possession of the present disclosure will recognize that powered devices provided in the power/data transmission extender system 200 may include any devices that may be configured to operate similarly as the powered devices 204*d*-204*f* discussed below.

As illustrated in FIG. 2, some of the powered devices 204*a*, 204*b*, and 204*c* may be connected directly to the powering device 202 via a single power/data cable that may be provided by, for example, an Ethernet cable (e.g., a Cat5 cable), a hybrid fiber/copper cable described by the inventors of the present disclosure in U.S. patent application Ser. No. 15/929,605, filed on May 12, 2020; and U.S. patent application Ser. No. 15/929,654, filed on May 14, 2020; the disclosures of which are incorporated by reference in their entirety, and/or any other power/data cable that would be apparent to one of skill in the art in possession of the present disclosure. As such, one of skill in the art in possession of the present disclosure will recognize that the powered devices 204*a*-204*c* in the examples below may transmit/receive data and receive power via their respective cables in a conventional manner (e.g., via PoE techniques, hybrid fiber/copper cable transmission techniques using the hybrid fiber/copper cabling referenced above, and/or other power/data transmission techniques that would be apparent to one of skill in the art in possession of the present disclosure). However, as discussed above, such conventional power/data transmission techniques are limited to transmitting power and data no further than 100 meters, as the voltage drop in the power transmitted over any cable that is greater than 100 meters long to a respective powered device 204*a*-204*c* will cause that power to degrade to a level that may be insufficient for the powered device 204*a*-204*c*. Thus, the powered devices 204*a*-204*c* will be limited in their positioning relative to the powering device 202 to a distance that can be covered by 100 meters of power/data cable (which is often much shorter than 100 meters (e.g., 50 meters) due to the need to route their cables through walls, around obstacles, etc.)

As also illustrated in FIG. 2, some of the powered devices 204*d*, 204*e*, and 204*f* may be coupled to the powering device 202 via at least one power/data transmission extender device that is provided according to the teachings of the present disclosure, as well as multiple power/data cables that may be provided by, for example, Ethernet cables, hybrid fiber/copper cables described by the inventors of the present disclosure in U.S. patent application Ser. No. 15/929,605, filed on May 12, 2020; and U.S. patent application Ser. No.

15/929,654, filed on May 14, 2020; the disclosures of which are incorporated by reference in their entirety, and/or any other power/data cable that would be apparent to one of skill in the art in possession of the present disclosure. For example, the powered device 204e is illustrated in FIG. 2 as being coupled to the powering device 202 by a power/data transmission extender device 206 that is connected to the powering device 202 by a power/data cable 208a, and that is connected to the powered device 204e by a power/data cable 208b.

Similarly, the powered device 204d is illustrated in FIG. 2 as being coupled to the powering device 202 by a pair of power/data transmission extender devices 210 and 212, with the power/data transmission extender device 210 connected to the powering device 202 by a power/data cable 214a and connected to the power/data transmission extender device 212 by a power/data cable 214b, and the power/data transmission extender device 212 connected to the powered device 204d by a power/data cable 214c. Similarly as well, the powered device 204f is illustrated in FIG. 2 as being coupled to the powering device 202 by a plurality of power/data transmission extender devices 216, 218, and up to 220, with the power/data transmission extender device 216 connected to the powering device 202 by a power/data cable 222a and connected to the power/data transmission extender device 218 by a power/data cable 222bm the power/data transmission extender device 218 connected to the power/data transmission extender device 220 by a power/data cable 222c, and the power/data transmission extender device 220 connected to the powered device 204f by a power/data cable 222d.

As discussed below, each of the powered devices 204d-204f in the examples below may receive power and data via the power/data transmission extender device(s) and power/data cables that couple that powered device to the powering device 202, with the power/data transmission extender devices 206, 210, 212, 216, 218, and up to 220 configured to ensure that the power received at the powered devices 204d-204f has substantially similar power characteristics (e.g., voltage) as the power that is transmitted by the powering device 202. As such, the power/data transmission extender devices of the present disclosure provide for the transmission of power and data from a powering device to a powered device over 100 meters, as the power/data transmission extender devices may remedy any voltage drop in the power received by that power/data transmission extender device over any particular power/data cable, thus preventing power from being provided to the powered devices 204d-204f that has been degraded to a level that may be insufficient for the powered devices 204d-204f due to its length of travel over any particular power/data cable.

Thus, the powered devices 204d-204f may be positioning relative to the powering device 202 at distances that require greater than 100 meters of power/data cabling, with the length of power/data cables provided between the powering device 202 and any of the powered devices 204d-204f only limited by the limits associated with transmitting data (e.g., currently 10 Gbps data transmissions are typically limited to transmission along approximately 500 meters of power/data cable). As such, one of skill in the art in possession of the present disclosure will appreciate that any number of power/data transmission extender devices may be provided between a powering device and a powered device, particularly as the limits associated with transmitting data over the power/data cables that connect those power/data transmission extender devices increases. However, while a specific power/data transmission extender system 200 has been illustrated and described, one of skill in the art in possession of the present disclosure will recognize that the power/data transmission extender system of the present disclosure may include a variety of components and component configurations while remaining within the scope of the present disclosure as well.

Figure 3:
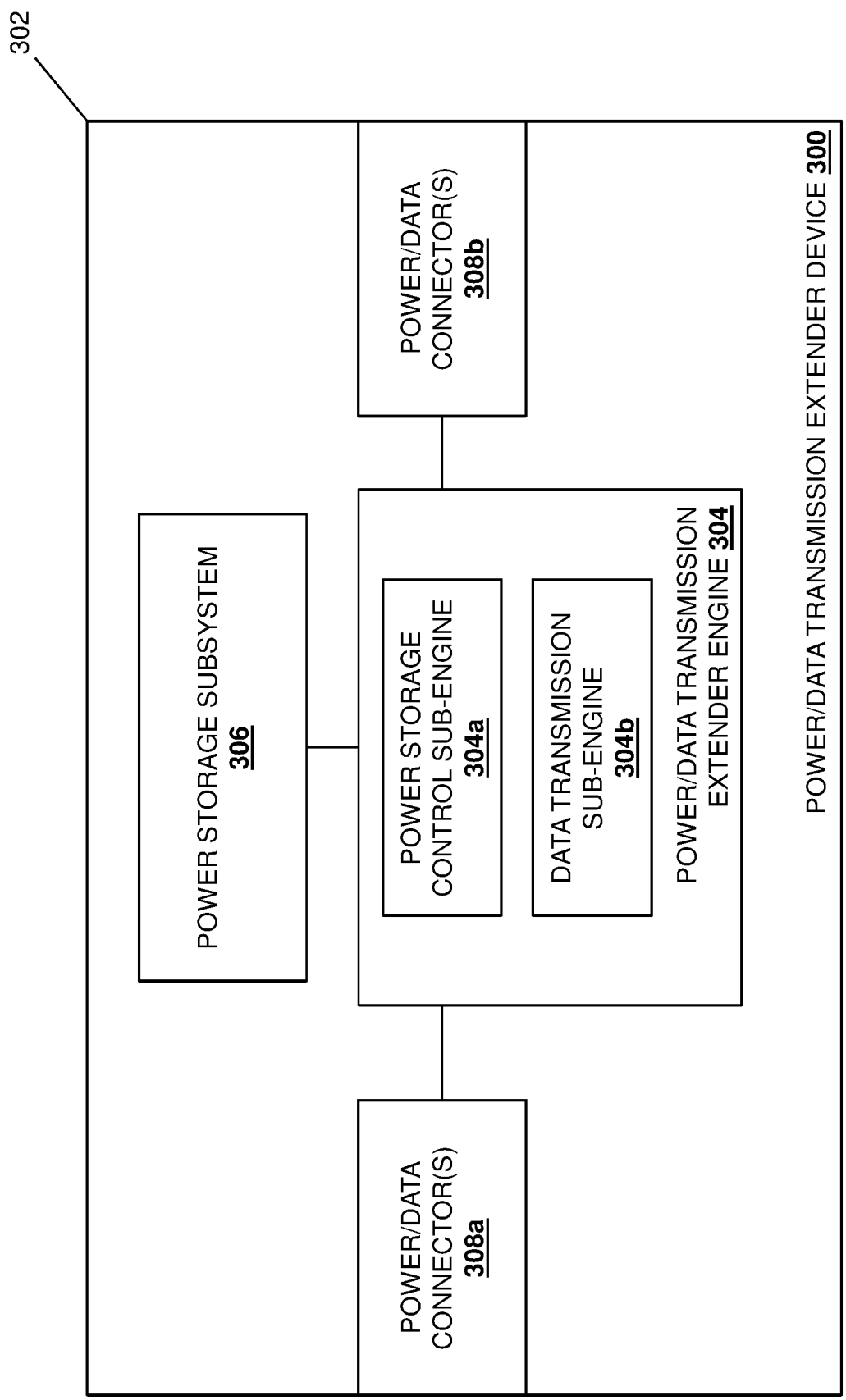
FIG. 3 is a schematic view illustrating an embodiment of a power/data transmission extender device that may be provided in the power/data transmission extender system of FIG. 2.

Referring now to FIG. 3, an embodiment of a power/data transmission extender device 300 is illustrated that may provide the any or all of the power/data transmission extender devices 206, 210, 212, 216, 218, and up to 220 discussed above with reference to FIG. 2. In some embodiments, the power/data transmission extender device 300 may be provided by the IHS 100 discussed above with reference to FIG. 1 and/or may include some or all of the components of the IHS 100. In the illustrated embodiment, the power/data transmission extender device 300 includes a chassis 302 that houses the components of the power/data transmission extender device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a power/data transmission extender engine 304 that is configured to perform the functionality of the power/data transmission extender engines and/or power/data transmission extender devices discussed below.

In the examples provided below, the power/data transmission extender engine 304 may be provided by a power storage control sub-engine 304a that is configured to perform the power functionality of the power/data transmission extender device 300, and a data transmission sub-engine 304b that is configured to perform the data functionality of the power/data transmission extender device 300. In some embodiments, the power storage control sub-engine 304a described in the examples below may be provided by a capacitor control circuit that may be included in the processing system and/or memory system in the chassis 302, while the data transmission sub-engine 304b described in the examples below may be provided by an Ethernet repeater module that may be included in the processing system and/or memory system in the chassis 302. However, while particular components are illustrated and described as performing the functionality of the power/data transmission extender engine 304 and/or power/data transmission extender device 300, one of skill in the art in possession of the present disclosure will recognize that the functionality of the power/data transmission extender device 300 may be provided by a variety of components and/or in a variety of manners that will fall within the scope of the present disclosure as well.

In the illustrated embodiment, the chassis 302 also houses a power storage subsystem 306 that is coupled to the power/data transmission extender engine 304 (e.g., the power storage control sub-engine 304a in the examples below). In the examples provided below, the power storage subsystem 306 may be provided by a plurality of capacitors (e.g., a "capacitor bank") and/or other components that one of skill in the art in possession of the present disclosure would recognize as enabling the power storage/provisioning functionality of the power storage subsystem 306 discussed below. However, while discussed as including a plurality of capacitors, one of skill in the art in possession of the present disclosure will recognize that the power storage subsystem 306 may be provided by a single capacitor, by other power storage/provisioning devices known in the art, and/or using other power storage/provisioning techniques that will fall within the scope of the present disclosure as well. In a specific example, the power storage subsystem 306 may be configured to supplement power received from the powering device (discussed below) in order to operate as an 802.3bt class 4 device and support up to 99 watts of power transmission.

The chassis 302 may also house a communication system that is illustrated in FIG. 3 as being provided by one or more power/data connectors 308a and one of more power/data connectors 308b, each of which is coupled to the power/data transmission extender engine 304 (e.g., via a coupling between the power/data connector(s) 308a and 308b and the processing system), and each of which may be configured to connect to a respective power/data cable such as an Ethernet cable, the hybrid fiber/copper cable discussed above, and/or other power-data cables that would be apparent to one of skill in the art in possession of the present disclosure. As discussed below, each of the power/data connectors 308a are configured to receive power (along with data) from a powering device and, in many embodiments, the power/data transmission extender device 300 may not include any other power system or power source (e.g., a separate power system and/or connection to another power source such as an AC wall outlet) other than the powering device (or power/data transmission extender device) connected to the power/data connectors 308a. However, while a specific power/data transmission extender device 300 has been illustrated, one of skill in the art in possession of the present disclosure will recognize that power/data transmission extender devices (or other devices operating according to the teachings of the present disclosure in a manner similar to that described below for the power/data transmission extender device 300) may include a variety of components and/or component configurations for providing conventional functionality, as well as the functionality discussed below, while remaining within the scope of the present disclosure as well.

Figure 4:
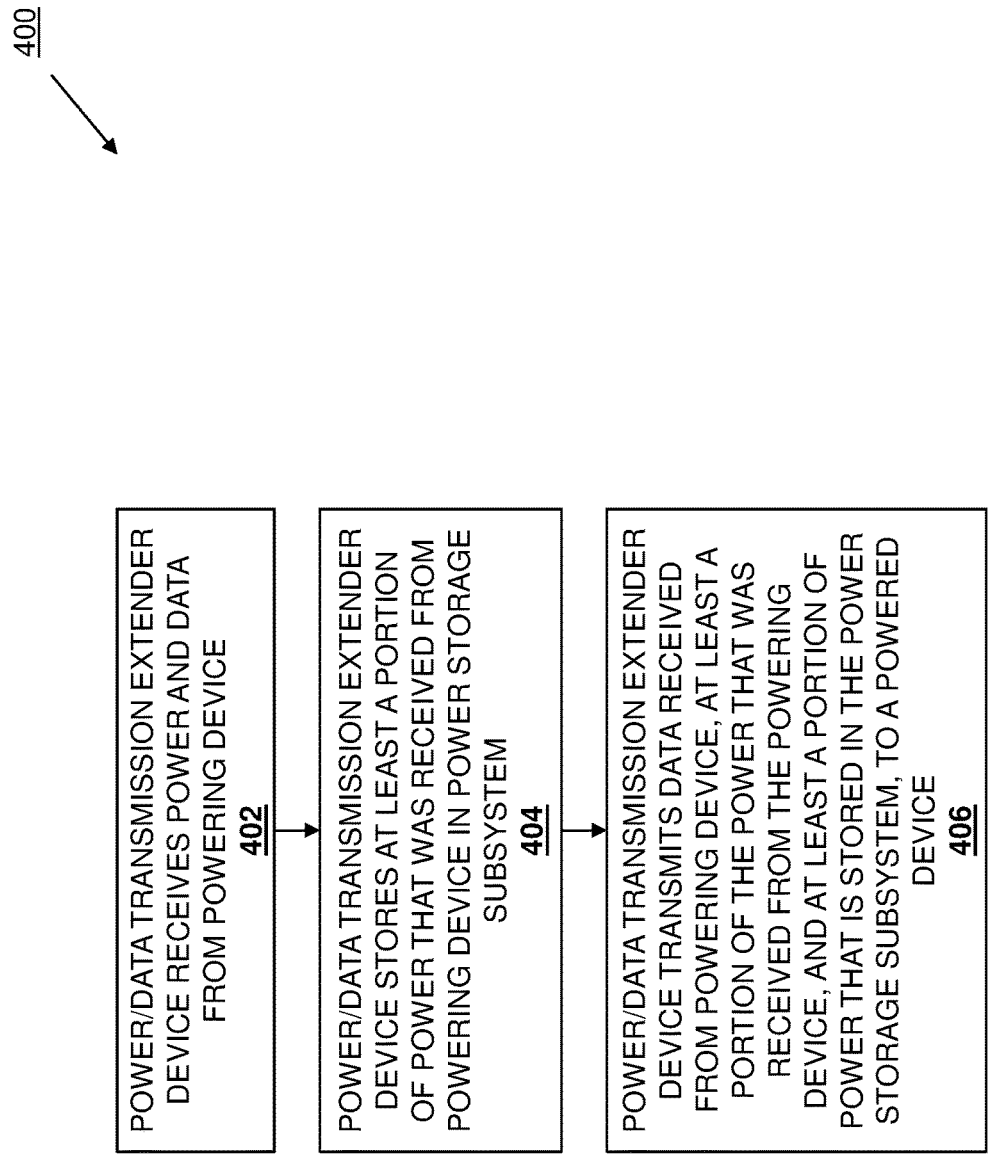
FIG. 4 is a flow chart illustrating an embodiment of a method for transmitting power and data.

Referring now to FIG. 4, an embodiment of a method 400 for transmitting power and data is illustrated. As discussed below, the systems and methods of the present disclosure provide one or more power/data transmission extender devices between a powering device and a powered device in order to allow power and data to be transmitted via a respective single cable that connects any two of: the powering device, the power/data transmission extender device(s), and the powered device. For example, the power/data transmission extender system of the present disclosure may include a power/data transmission extender device that is coupled to a powering device and a powered device, with the power/data transmission extender device receiving power and data from the powering device via a first power/data cable that is connected to the power/data transmission extender device, and storing at least a portion of the power that was received from the powering device via the first power/data cable in a power storage subsystem that is included in the power/data transmission extender device. The power/data transmission extender device may also transmit the data that was received from the powering device, at least a portion of the power that was received from the powering device, and at least a portion of power that is stored in the power storage subsystem, to the powered device via a second power/data cable that is connected to the power/data transmission extender device. As such, the distance that power and data may be transmitted from a powering device to a powered device over single cable connections may be extended relative to conventional power/data transmission systems.

Figure 5A:
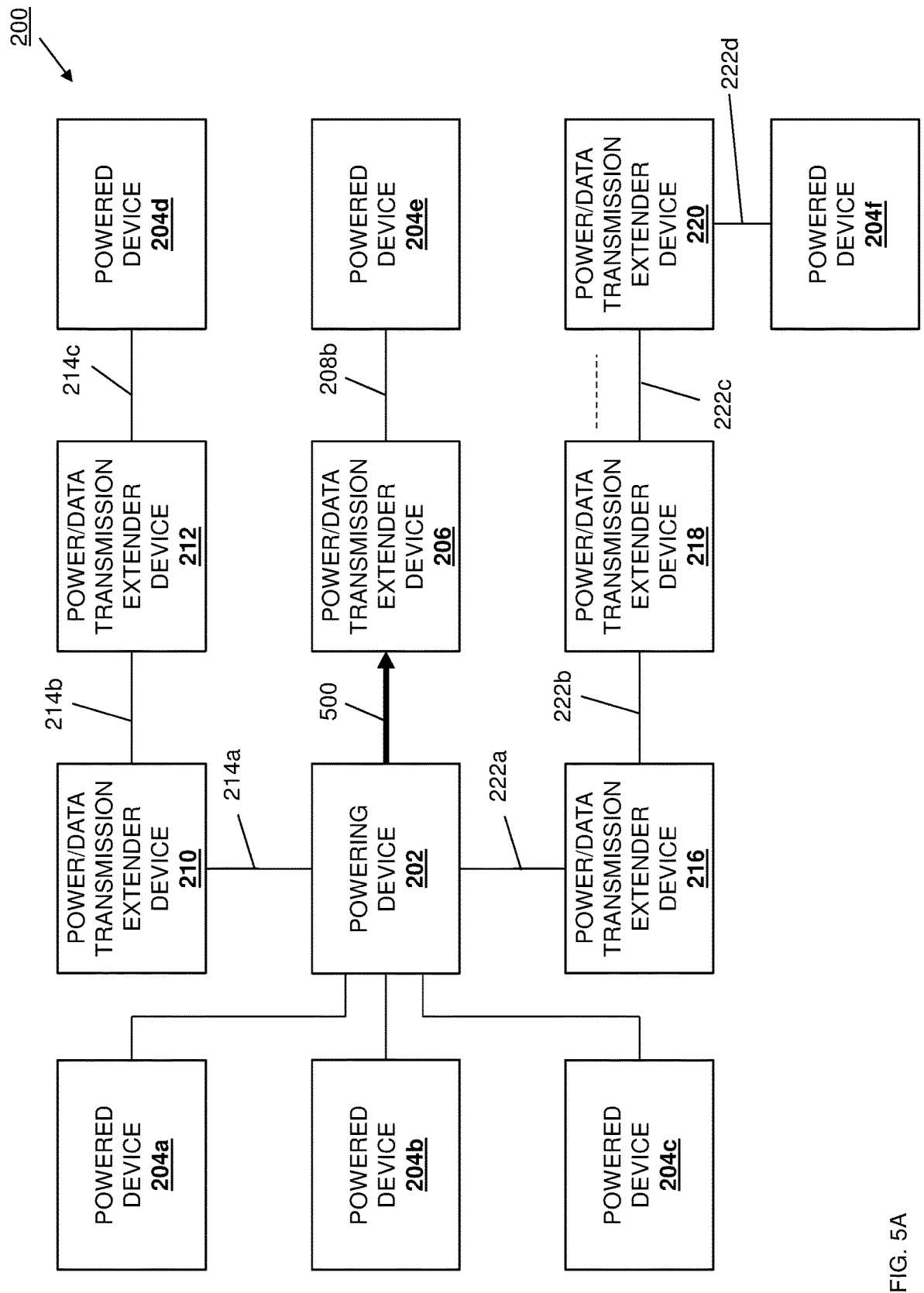
FIG. 5A is a schematic view illustrating an embodiment of the power/data transmission extender system of FIG. 2 operating during the method of FIG. 4.

The method 400 begins at block 402 where a power/data transmission extender device receives power and data from a powering device. With reference to FIG. 5A, in an embodiment of block 402, the powering device 202 may operate to perform power/data transmission operations 500 that include the transmission of power and data via the power/data cable 208a to the power/data transmission extender device 206. For example, one of skill in the art in possession of the present disclosure will recognize how the powering device 202 may be provided by a switch device that includes a connection to a power source (e.g., an Alternating Current (AC) wall outlet), and how that switch device may receive, via a data connector on the powering switch device, data for transmission to the powered device 204e at block 402. In response to receiving the data, the powering switch device may then transmit power received from the power source along with that data through a power/data connector on the powering switch device 202, via the power/data cable 208a connected to that power/data connector, and to the power/data transmission extender device 206.

Figure 5B:
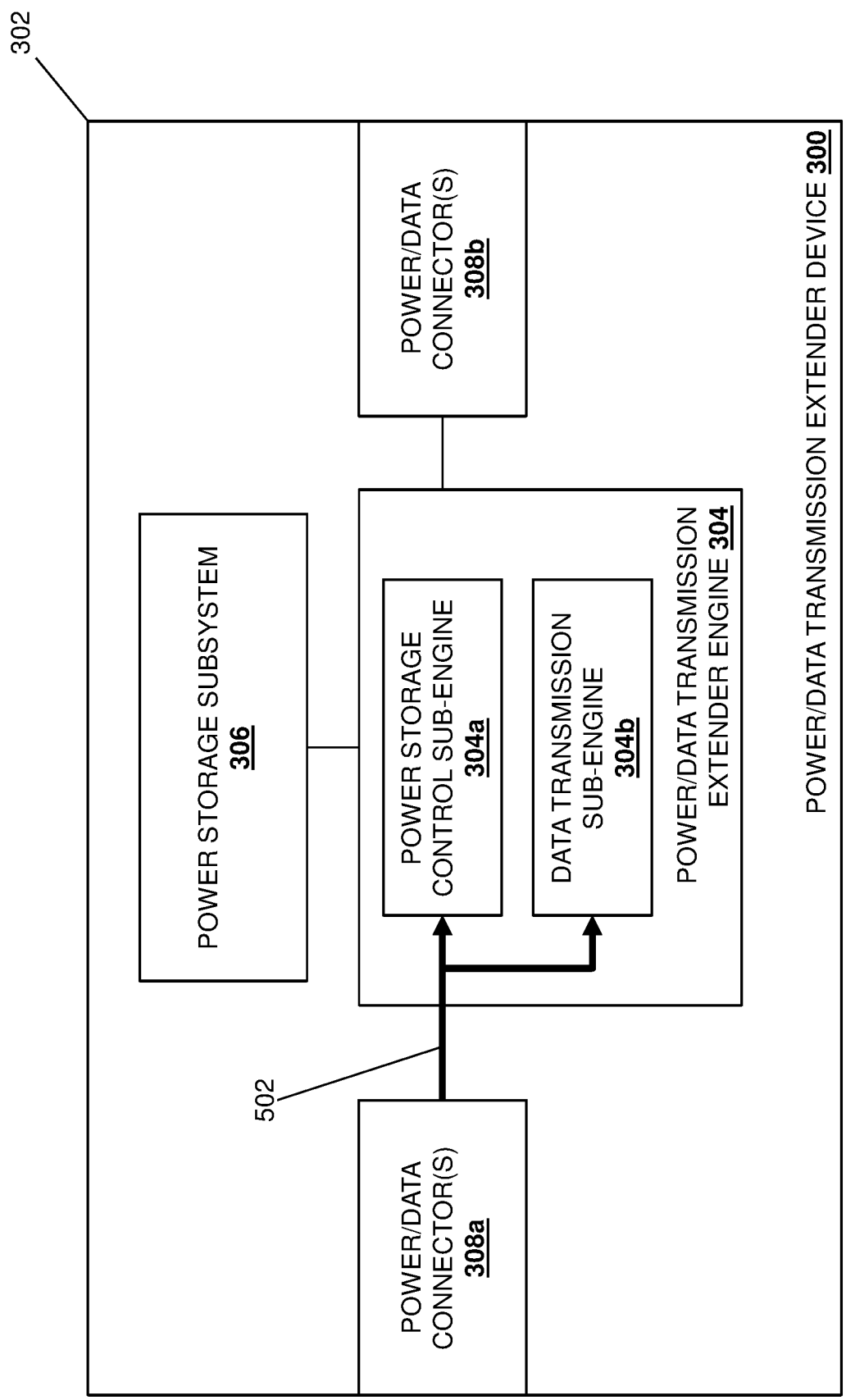
FIG. 5B is a schematic view illustrating an embodiment of the power/data transmission extender device of FIG. 3 operating during the method of FIG. 4.

As discussed above, in some embodiments the transmission of power and data at block 402 may be performed using PoE transmission techniques that operate to transmit the power and data via a single Ethernet cable that provides the power/data cable 208a. In other embodiments, the transmission of power and data at block 402 may be performed using hybrid fiber/copper transmission techniques that operate to transmit the power and data via a single hybrid fiber/copper cable that provides the power/data cable 208a. However, one of skill in the art in possession of the present disclosure will appreciate that the power and data may be transmitted in a variety of manners that will fall within the scope of the present disclosure as well. With reference to FIG. 5B, at block 402, the power/data transmission extender engine 304 in the power/data transmission extender device 206/300 may perform power/data receiving operations 502 that, in the illustrated example, include the power and data transmitted by the powering device 202 being received via the power/data cable 208a by one of the power/data connectors 308a that is connected to that power/data connector 208a, with that power being provided by that power/data connector 308a to the power storage control sub-engine 304a in the power/data transmission extender engine 304, and that data being provided by that power/data connector 308a to the data transmission sub-engine 304b in the power/data transmission extender engine 304. However, while the illustrated example discusses the handling of the power and data received from the powering device 202 by different sub-engines in the power/data transmission extender device 300, one of skill in the art in possession of the present disclosure will recognize that the power/data transmission extender engine functionality discussed below may be performed in a variety of manners that will fall within the scope of the present disclosure as well.

Figure 5C:
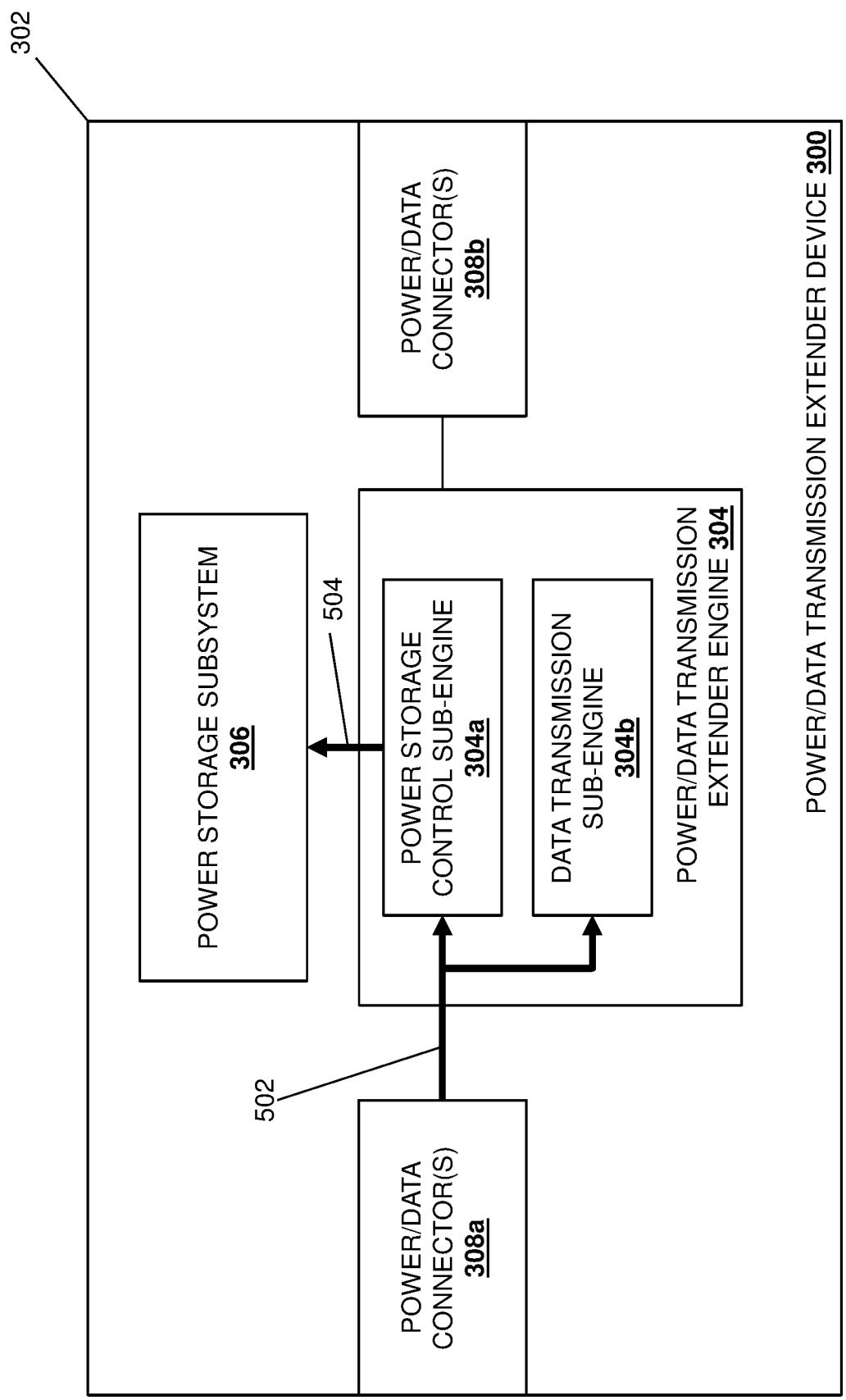
FIG. 5C is a schematic view illustrating an embodiment of the power/data transmission extender device of FIG. 3 operating during the method of FIG. 4.

The method 400 then proceeds to block 404 where the power/data transmission extender device stores at least a portion of the power that was received from the powering device in a power storage subsystem. With reference to FIG. 5C, in an embodiment of block 404, the power storage control sub-engine 304a in the power/data transmission extender engine 304 may perform power storage operations 504 that operate to store at least a portion of the power that was received from the powering device 202 (as part of the power/data receiving operations 502 at block 402) in the power storage subsystem 306. For example, as discussed above, the power storage subsystem 306 may be provided by a plurality of capacitors, and the power storage control sub-engine 304*a* provided by a capacitor control circuit may receive the power provided by the powering device 202 at block 402, and use at least a portion of that power to charge a subset of the plurality of capacitors that provide the power storage subsystem 306. As discussed below, in situations in which the power storage subsystem 306 is provided by a plurality of capacitors, during any given time period a first subset of those capacitors (e.g., 3 capacitors) may be utilized by the power storage control sub-engine 304*a* in the power/data transmission extender engine 304 to store power received from the powering device 202, and a second subset of those capacitors (e.g., 4 capacitors) may be utilized by the power storage control sub-engine 304*a* in the power/data transmission extender engine 304 to transmit power to the powered device 204*e* (discussed below). As such, at block 404, the first subset of the plurality of capacitors that provide the power storage subsystem 306 may be utilized to store power as part of the power storage operations 504. However, one of skill in the art in possession of the present disclosure will recognize how at least one capacitor (and in some cases all of the capacitors) providing the power storage subsystem 306 may be used to both store power received from the powering device 202 and transmit power to the powered device 204*e* during the method 400 while remaining within the scope of the present disclosure as well.

Figure 5D:
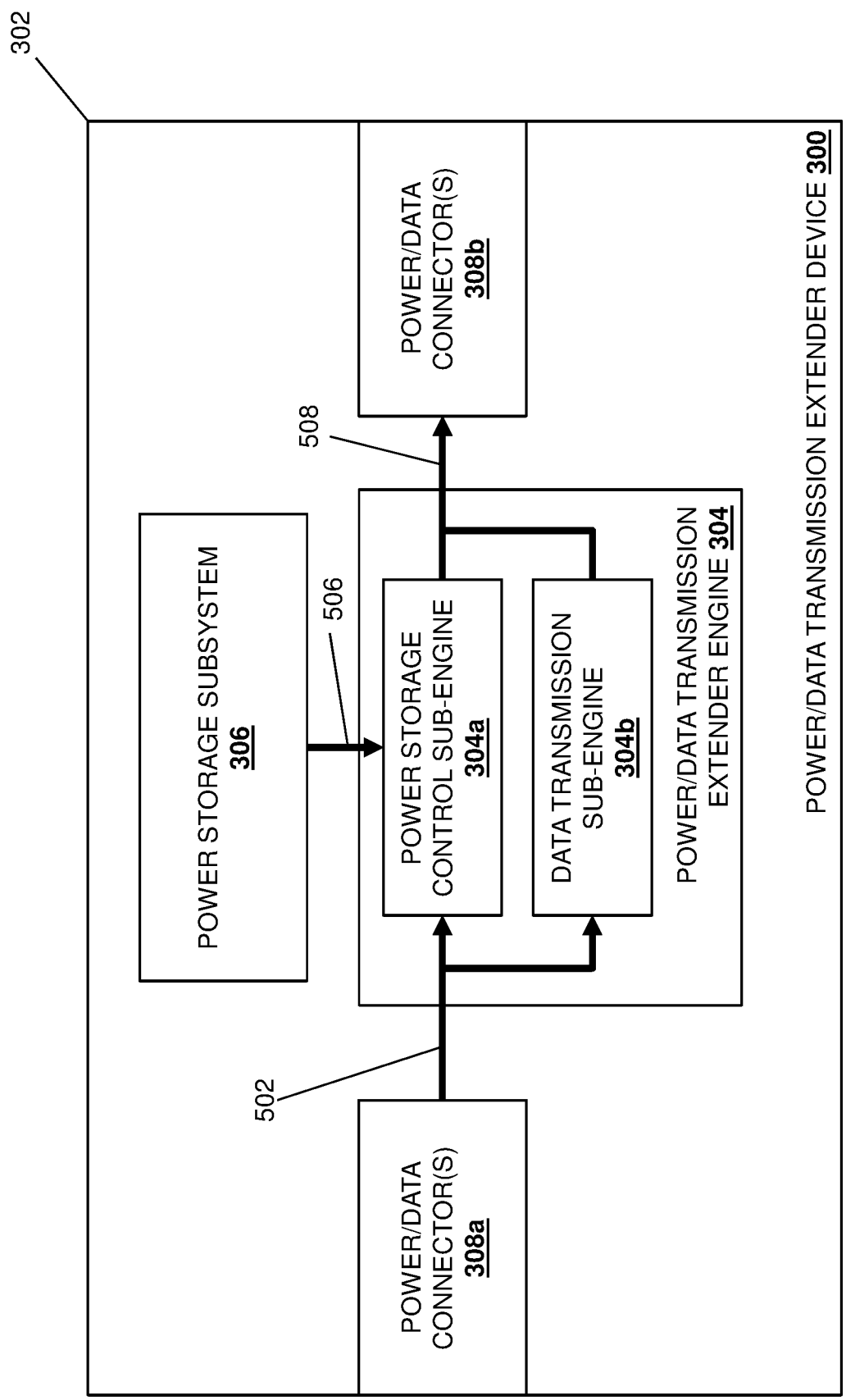
FIG. 5D is a schematic view illustrating an embodiment of the power/data transmission extender device of FIG. 3 operating during the method of FIG. 4.

The method 400 then proceeds to block 406 where the power/data transmission extender device transmits the data received from the powering device, at least a portion of the power that was received from the powering device, and at least a portion of power that is stored in the power storage subsystem, to a powered device. With reference to FIG. 5D, in an embodiment of block 406, the power/data transmission extender engine 304 may operate to perform power retrieval operations 506 and power/data transmission operations 508 that include, in the illustrated example, the power storage control sub-engine 304*a* (e.g., a capacitor control circuit) in the power/data transmission engine 304 performing the power retrieval operations 506 to retrieve at least a portion of power that is stored in the power storage subsystem 306 (e.g., in a subset of capacitors that were previously charged), and the power storage control sub-engine 304*a* and the data transmission sub-engine 304*b* in the power/data transmission engine 304 performing the power/data transmission operations 508 to transmit the power that was retrieved from the power storage subsystem 306 (as part of the power retrieval operations 506), at least a portion of the power received from the powering device 202 (as part of the power/data receiving operations 502 at block 402), and the data that was received from the powering device 202 (as part of the power/data receiving operations 502 at block 402) via one of the power/data connectors 308*b*. As will be appreciated by one of skill in the art in possession of the present disclosure, an Ethernet repeater module providing the data transmission sub-engine 304*b* may operate to transmit the data received from the powering device 202 at block 402 using a variety of data transmission techniques that would be apparent to one of skill in the art in possession of the present disclosure.

For example, in embodiments that utilize PoE transmission techniques to transmit data and power via an Ethernet cable, the power/data transmission operations 508 may operate transmit the power that was retrieved from the power storage subsystem 306 (as part of the power retrieval operations 506) and at least a portion of the power received from the powering device 202 (as part of the power/data receiving operations 502 at block 402) via a first subset of wiring (e.g., a first set of four wires provided in two twisted pairs) in the Ethernet cable, and transmit the data that was received from the powering device 202 (as part of the power/data receiving operations 502 at block 402) via a second subset of wiring (e.g., a second set of four wires provided in two twisted pairs) in the Ethernet cable. In another example, in embodiments that utilize hybrid fiber/copper transmission techniques to transmit data and power via the hybrid fiber/copper cable discussed above, the power/data transmission operations 508 may operate transmit the power that was retrieved from the power storage subsystem 306 (as part of the power retrieval operations 506) and at least a portion of the power received from the powering device 202 (as part of the power/data receiving operations 502 at block 402) via copper wiring in the hybrid fiber/copper cable, and transmit the data that was received from the powering device 202 (as part of the power/data receiving operations 502 at block 402) via fiber optic wiring in the hybrid fiber/copper cable. However, while two specific examples are provided, one of skill in the art in possession of the present disclosure will recognize that other techniques for transmitting power and data via a power/data cable will fall within the scope of the present disclosure as well.

In an embodiment, the power retrieved from the power storage subsystem 306 as part of the power retrieval operations 506 may be configured to supplement the power that was received from the powering device 202 via the power/data cable 208*a* and power/data connector 308*a* in order to allow the power that is transmitted as part of the power/data transmission operations 508 to include power characteristics that are substantially similar to the power that was transmitted by the powering device 202. For example, the power transmitted by the powering device 202 may include a first voltage (e.g., 48 volts) immediately after leaving the powering device 202 via its power/data connector that is connected to the power/data cable 208*a*, but may degrade as it is transmitted along the length of the power/data cable 208*a* such that it includes a second voltage (e.g., 46 volts) when it is received at the power/data connector 308*a* on the power/data transmission extender device 206/300. As such, at block 406, the power storage control sub-engine 304*a* in the power/data transmission extender engine 304 may operate to identify the degraded power received at the power connector 308*a* and, in response, perform the power retrieval operations 506 to retrieve power from the power storage subsystem 306 in a manner that provides the power transmitted as part of the power/data transmission operations 508 with the first voltage (e.g., 48 volts) that it had immediately after leaving the powering device 202.

However, while specific operations to supplement the power that was received from the powering device 202 in order to allow the power that is transmitted to the powered device 204*e* to include power characteristics that are substantially similar to the power that was transmitted by the powering device 202 have been described, one of skill in the art in possession of the present disclosure will appreciate that the supplementing of the power received by the power/data transmission extender device 300 may be performed in a variety of manners that will fall within the scope of the present disclosure as well. For example, while the power received from the powering device 202 is described as being supplemented with power stored in the power storage subsystem 206 such that it is equal (e.g., in voltage) to the power initially transmitted by the powering device 202, one of skill in the art in possession of the present disclosure will recognize that the power received from the powering device 202 may be supplemented with power stored in the power storage subsystem 206 such that it is substantially similar (e.g., it has substantially similar power characteristics) to the power initially transmitted by the powering device 202 in a manner that allows the powered device 204e to operate as if it was directly connected to the power/data cable 208a. As such, any supplementation of the power received from the powering device 202 with power stored in the power storage subsystem 206 in order to provide power to a powering device that allows that powering device to operate properly (i.e., perform full-power operations) is envisioned as falling within the scope of the present disclosure.

Furthermore, one of skill in the art in possession of the present disclosure will recognize that the powered device 204e may be connected to the power/data transmission extender device 206 by a relatively long power/data cable 208b (e.g., a 100 meter power/data cable), and thus the power transmitted as part of the power/data transmission operations 508 may be provided by supplementing the power received from the powering device 202 with power stored in the power storage subsystem 306 such that the power transmitted as part of the power/data transmission operations 508 has sufficient power characteristics (e.g., voltage) upon reaching the powered device 204e that allow the powered device 204e to operate properly (i.e., the powered device 204e is not limited in any manner based on the power characteristics of the power that is received from the power/data transmission extender device 206 via the power/data cable 208b). Thus, in some embodiments, the power received from the powering device 202 may be supplemented with power stored in the power storage subsystem 306 such that it may be transmitted 100 meters via a power/data cable without being degraded to level the reduces the operation of the powered device that receives that power.

While the method 400 describes power received from the powering device 202 as being both stored in the power storage subsystem 306 and transmitted to the powered device 204e, one of skill in the art in possession of the present disclosure will recognize that these operations (i.e., the storage and transmittal of the power received from the powering device 202) may be performed during different time periods in some embodiments. For example, the power received from the powering device 202 may be stored in the power storage subsystem 306 during a first time period, while the power received from the powering device 202 may be transmitted to the powered device 204e during a second time period that follows the first time period. As such, capacitors in the power storage subsystem 306 may be charged using the power received from the powering system 202, and then used to allow steady-state power to be transmitted by the power/data transmission extender device 206. In a specific example, the power/data transmission extender device 300 may be configured to identify the power usage by the powered device 204e and, in response, perform the power storage operations 504 when power requirements of the powered device 204e are relatively low, while performing the power retrieval operations 506 when the power requirements of the powered device 204e are relatively high. However, one of skill in the art in possession of the present disclosure will recognize that portions of the power received from the powering device 202 may be both stored in the power storage subsystem 306 and transmitted to the powered device 304e during the same time period while remaining within the scope of the present disclosure as well.

Furthermore, while the method 400 describes the power being received from the powering device 202 along with the data for the powered device 204e, one of skill in the art in possession of the present disclosure will appreciate that the powering device 202 may transmit power without data over the power/data cable 208a to the power/data transmission extender device 206 in some embodiments. For example, in the event a switch device that provides the powering device 202 has not received data for the powered device 204e, that powering switch device may still operate to provide power via the power/data cable 208a to the power/data transmission extender device 206, and the power/data transmission extender device 206 may then operate to store that power in the power storage subsystem 306 and/or transmit that power to the powered device 204e while remaining within the scope of the present disclosure as well.

Figure 5E:
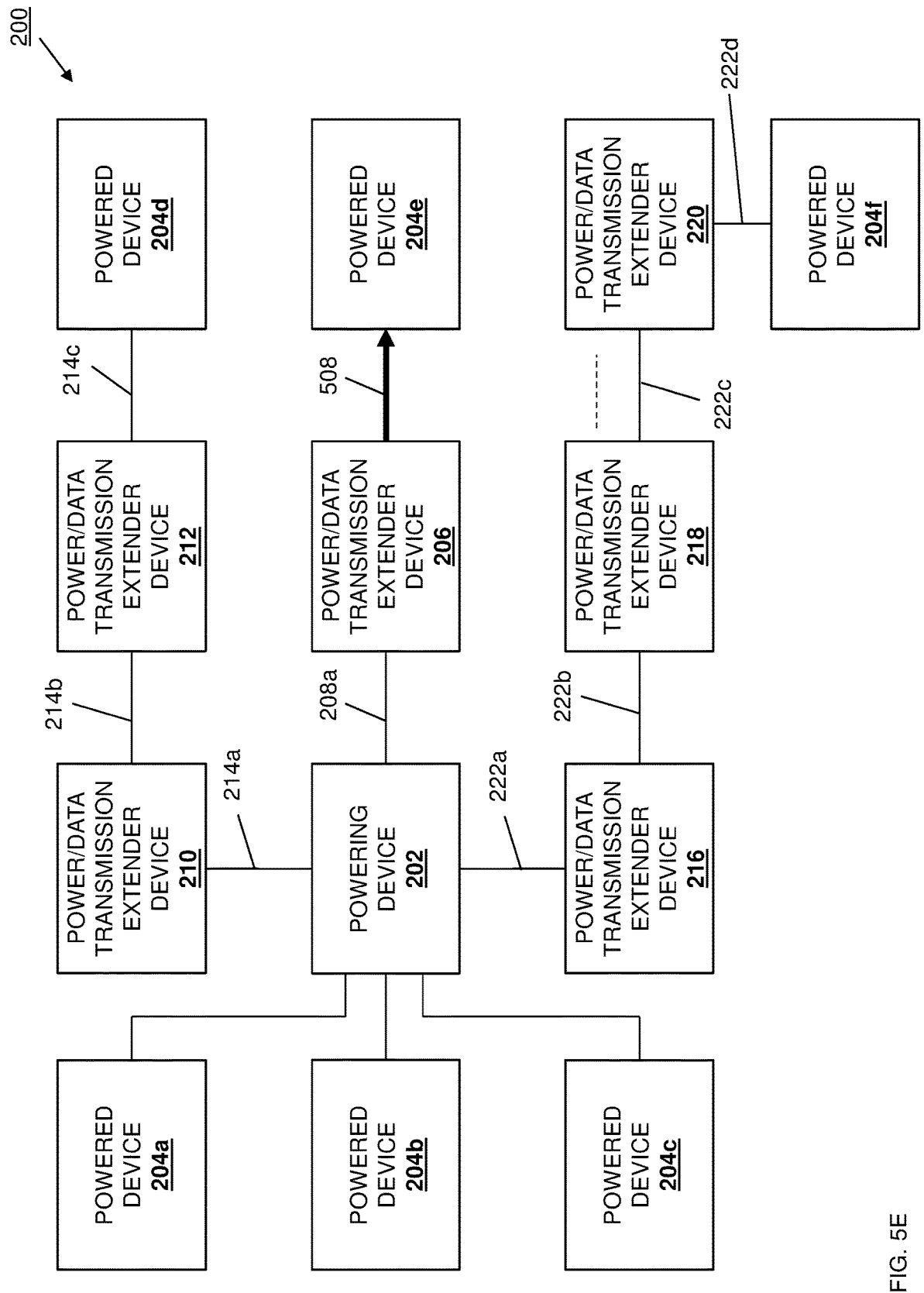
FIG. 5E is a schematic view illustrating an embodiment of the power/data transmission extender system of FIG. 2 operating during the method of FIG. 4.

With reference to FIG. 5E, the power/data transmission operations 508 performed by the power/data transmission extender engine 304 in the power/data transmission extender device 206/300 may include the transmission of power and data out of the power data connector 308a and via the power/data cable 208b to the powered device 204e. As such, the powered device 204e may receive the power transmitted by the power/data transmission extender device 206 as part of the power/data transmission operations 508 and use that power to power any of the components in the powered device 204e, as well as receive the data transmitted by the power/data transmission extender device 206 as part of the power/data transmission operations 508 and use that data in any of its powered device operations. As discussed above, the power received from the power/data transmission extender device 206 via the power/data cable 208b as part of the power/data transmission operations 508 has been supplemented by the power/data transmission extender device 206 to overcome the degradation of that power as it travels through the power/data cables 208a and 208b, allowing for full power operations of the powered device 204e using that power. As will be appreciated by one of skill in the art in possession of the present disclosure, a specific example of the embodiments illustrated and described above would allow for full operations of the powered device 204e with 200 meters of power/data cabling (e.g., with each of the power/data cables 208a and 208b having a length of 100 meters) and one power/data transmission extender device 206.

Furthermore, one of skill in the art in possession of the present disclosure will appreciate how the powered device 204e may transmit data via the power/data cables 208a and 208b and the power/data transmission extender device 206 to the powering device 202 (e.g., using the data transmission sub-engine 304b that, as discussed above, may be provided by an Ethernet repeater module). As such, data may be exchanged between the powering device 202 and the powered device 204e, with power provided by the powering device 202 to the powered device 204e via single power/data cables 208a and 208b connected in series using the power/data transmission extender device 206.

While not discussed in detail above, one of skill in the art in possession of the present disclosure will appreciate how power and data may be transmitted by the powering device 202 to the powered device 204d via the power/data transmission extender devices 210 and 212, and/or by the powering device 202 to the powered device 204f via the power/data transmission extender devices 216, 218, and up to 220, in a similar manner as discussed above. As such, the power/data transmission extender device 210 may receive power and data from the powering device 202 and transmit power and data in substantially that same manner as described for the power/data transmission extender device 206 above, with the power/data transmission extender device 212 receiving power and data from the power/data transmission extender device 210 (in place of the powering device 202 as discussed above) and transmitting power and data to the powered device 204*d* in substantially that same manner as described for the power/data transmission extender device 206 above. Thus, degradation of power transmitted by the power/data transmission extender device 210 to the power/data transmission extender device 212 over the power/data cable 214*b* may be supplemented by the power/data transmission extender device 212 before its transmittal to the powered device 204*d*, allowing the powered device 204*d* to perform full powered device operations using that power.

Similarly, the power/data transmission extender device 216 may receive power and data from the powering device 202 and transmit power and data in substantially that same manner as described for the power/data transmission extender device 206 above, with the power/data transmission extender device 218 receiving power and data from the power/data transmission extender device 216 (in place of the powering device 202 as discussed above) and transmitting power and data in substantially that same manner as described for the power/data transmission extender device 206 above, and with the power/data transmission extender device 220 receiving power and data from the power/data transmission extender device 218 (in place of the powering device 202 as discussed above) and transmitting power and data to the powered device 204*f* in substantially that same manner as described for the power/data transmission extender device 206 above. Thus, degradation of power transmitted by the power/data transmission extender device 216 to the power/data transmission extender device 218 over the power/data cable 222*b* may be supplemented by the power/data transmission extender device 218 before its transmittal to the power/data transmission extender device 220, and degradation of power transmitted by the power/data transmission extender device 218 to the power/data transmission extender device 220 over the power/data cable 222*c* may be supplemented by the power/data transmission extender device 220 before its transmittal to the powered device 204*f*, allowing the powered device 204*f* to perform full powered device operations using that power.

Thus, systems and methods have been described that provide one or more power/data transmission extender devices between a switch device and a computing device in order to allow power and data to be transmitted via a respective single cable that connects any two of: the switch device, the power/data transmission extender device(s), and the computing device. For example, the power/data transmission extender system of the present disclosure may include a power/data transmission extender device that is coupled to a switch device and a computing device, with the power/data transmission extender device receiving power and data from the switch device via a first power/data cable that is connected to the power/data transmission extender device, and storing at least a portion of the power that was received from the switch device via the first power/data cable in a capacitor bank that is included in the power/data transmission extender device. The power/data transmission extender device may also transmit the data that was received from the switch device, at least a portion of the power that was received from the switch device, and at least a portion of power that is stored in the capacitor bank, to the computing device via a second power/data cable that is connected to the power/data transmission extender device. As such, the distance that power and data may be transmitted from a switch device to a computing device over respective single cables may be extended relative to conventional power/data transmission systems without the need for any power injectors and/or separate power source connections.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power/data transmission extender system, comprising:
   a powering device;
   a powered device; and
   a power/data transmission extender device that is coupled to the powering device and the powered device, wherein the power/data transmission extender device is configured to:
      receive, from the powering device, power and data via a first power/data cable that is connected to the power/data transmission extender device, wherein the power is transmitted by the powering device with first power characteristics;
      store at least a portion of the power received from the powering device via the first power/data cable in a power storage subsystem that is included in the power/data transmission extender device;
      determine that the power received from the powering device via the first power/data cable has second power characteristics that are degraded relative to the first power characteristics; and
      transmit, to the powered device in response to determining that the power received from the powering device has the second power characteristics that are degraded relative to the first power characteristics, the data that was received from the powering device and at least a portion of the power that was received from the powering device supplemented by at least a portion of the power that is stored in the power storage subsystem in order to transmit a total power that includes total power characteristics that are substantially similar to the first power characteristics, via a second power/data cable that is connected to the power/data transmission extender device.

2. The system of claim 1, wherein the power storage subsystem includes a plurality of capacitors, the at least the portion of the power received from the powering device via the first power/data cable is stored in a first subset of the plurality of capacitors, and the at least the portion of the power transmitted via the second power/data cable is stored on a second subset of the plurality of capacitors.

3. The system of claim 1, wherein the first power/data cable and the second power/data cable are each provided by a respective Ethernet cable.

4. The system of claim 1, wherein the first power/data cable and the second power/data cable are each provided by a respective hybrid fiber optic/copper cable.

5. The system of claim 1, wherein a combined length of the first power/data cable and the second power/data cable is greater than 100 meters.

6. The system of claim 1, wherein the storing of the at least the portion of the power received from the powering device via the first power/data cable in the power storage subsystem is performed at a first time, and wherein the transmission of the at least a portion of the power that is stored in the power storage subsystem via the second power/data cable is performed at a second time that is different than the first time.

7. An Information Handling System (IHS), comprising:
a processing system; and
a memory system that is coupled to the processing system and that includes instructions that, when executed by the processing system, cause the processing system to provide a power/data transmission extender engine that is configured to:
receive, from a powering device, power and data via a first power/data cable that is coupled to the processing system, wherein the power is transmitted by the powering device with first power characteristics;
store at least a portion of the power received from the powering device via the first power/data cable in a power storage subsystem that is coupled to the processing system;
determine that the power received from the powering device via the first power/data cable has second power characteristics that are degraded relative to the first power characteristics; and
transmit, to a powered device in response to determining that the power received from the powering device via the first power/data cable has the second power characteristics that are degraded relative to the first power characteristics, the data that was received from the powering device and at least a portion of the power that was received from the powering device supplemented by at least a portion of the power that is stored in the power storage subsystem in order to transmit a total power that includes total power characteristics that are substantially similar to the first power characteristics, via a second power/data cable that is coupled to the processing system.

8. The IHS of claim 7, wherein the power storage subsystem includes a plurality of capacitors, the at least the portion of the power received from the powering device via the first power/data cable is stored in a first subset of the plurality of capacitors, and the at least the portion of the power transmitted via the second power/data cable is stored on a second subset of the plurality of capacitors.

9. The IHS of claim 7, wherein the first power/data cable and the second power/data cable are each provided by a respective Ethernet cable.

10. The IHS of claim 7, wherein the first power/data cable and the second power/data cable are each provided by a respective hybrid fiber optic/copper cable.

11. The IHS of claim 7, wherein a combined length of the first power/data cable and the second power/data cable is greater than 100 meters.

12. The IHS of claim 7, wherein the storing of the at least the portion of the power received from the powering device via the first power/data cable in the power storage subsystem is performed at a first time, and wherein the transmission of the at least a portion of the power that is stored in the power storage subsystem via the second power/data cable is performed at a second time that is different than the first time.

13. The IHS of claim 7, wherein the power received from the powering device via the first power/data cable is the only source of power for the processing system.

14. A method for transmitting power and data, comprising:
receiving, by a power/data transmission extender device from a powering device, power and data via a first power/data cable that is connected to the power/data transmission extender device, wherein the power is transmitted by the powering device with first power characteristics;
storing, by the power/data transmission extender device, at least a portion of the power received from the powering device via the first power/data cable in a power storage subsystem that is included in the power/data transmission extender device;
determining, by the power/data transmission extender device, that the power received from the powering device via the first power/data cable has second power characteristics that are degraded relative to the first power characteristics; and
transmitting, by the power/data transmission extender device to a powered device in response to determining that the power received from the powering device via the first power/data cable has the second power characteristics that are degraded relative to the first power characteristics, the data that was received from the powering device and at least a portion of the power that was received from the powering device supplemented by at least a portion of the power that is stored in the power storage subsystem in order to transmit a total power that includes total power characteristics that are substantially similar to the first power characteristics, via a second power/data cable that is connected to the power/data transmission extender device.

15. The method of claim 14, wherein the power storage subsystem includes a plurality of capacitors, the at least the portion of the power received from the powering device via the first power/data cable is stored in a first subset of the plurality of capacitors, and the at least the portion of the power transmitted via the second power/data cable is stored on a second subset of the plurality of capacitors.

16. The method of claim 14, wherein the first power/data cable and the second power/data cable are each provided by a respective Ethernet cable.

17. The method of claim 14, wherein the first power/data cable and the second power/data cable are each provided by a respective hybrid fiber optic/copper cable.

18. The method of claim 14, wherein a combined length of the first power/data cable and the second power/data cable is greater than 100 meters.

19. The method of claim 14, wherein the storing of the at least the portion of the power received from the powering device via the first power/data cable in the power storage subsystem is performed at a first time, and wherein the transmission of the at least a portion of the power that is stored in the power storage subsystem via the second power/data cable is performed at a second time that is different than the first time.

20. The method of claim 14, wherein the power received from the powering device via the first power/data cable is the only source of power for the power/data transmission extender device.

* * * * *